US011349773B2

(12) United States Patent
Datta

(10) Patent No.: US 11,349,773 B2
(45) Date of Patent: May 31, 2022

(54) MAINTAINING DISTRIBUTED REFERENCES TO DATA FOR USE BY DEVICES OF A COMPUTER NETWORK

(71) Applicant: EMC IP Holding Company LLC, Hopkinton, MA (US)

(72) Inventor: Pankaj Datta, Acton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 40 days.

(21) Appl. No.: 17/083,621

(22) Filed: Oct. 29, 2020

(65) Prior Publication Data
US 2022/0141149 A1 May 5, 2022

(51) Int. Cl.
*H04L 47/76* (2022.01)
*G06F 16/23* (2019.01)
*H04L 67/1097* (2022.01)
*G06F 16/25* (2019.01)
*G06F 16/28* (2019.01)

(52) U.S. Cl.
CPC .......... *H04L 47/76* (2013.01); *G06F 16/2379* (2019.01); *G06F 16/258* (2019.01); *G06F 16/284* (2019.01); *H04L 67/1097* (2013.01)

(58) Field of Classification Search
CPC . H04L 47/76; H04L 67/1097; G06F 16/2379; G06F 16/258; G06F 16/284
See application file for complete search history.

(56) References Cited

U.S. PATENT DOCUMENTS

| | | | |
|---|---|---|---|
| 2011/0196664 A1* | 8/2011 | Zunger | G06F 11/2094 703/21 |
| 2018/0253237 A1* | 9/2018 | Borlick | G06F 3/0635 |
| 2018/0364937 A1* | 12/2018 | Ki | G06F 3/0638 |
| 2021/0377272 A1* | 12/2021 | Dasari | H04L 63/102 |

* cited by examiner

*Primary Examiner* — El Hadji M Sall
(74) *Attorney, Agent, or Firm* — Amin, Turocy & Watson, LLP

(57) ABSTRACT

Maintaining distributed references to data stored on devices of a computer network is described. For instance, a system includes a request component that can communicate a removal request to network equipment to remove a resource from storage by first storage equipment. The system can further include an indicator component that can receive, from the network equipment, a first indication that the removal request did not cause removal of the resource. The removal request can be determined not to have caused the network equipment to remove the resource based on index information of a resource index, which could have identified that the resource was referenced by a resource stub stored on second storage equipment.

20 Claims, 10 Drawing Sheets

400 ⟶

MAINTAINING DISTRIBUTED REFERENCES TO DATA FOR USE BY DEVICES OF A COMPUTER NETWORK

TECHNICAL FIELD

The subject application generally relates to computer applications, and, for example, to maintaining distributed references to data stored on devices of a computer network, and related embodiments.

BACKGROUND

As more and more shared data are being migrated to networked data systems, the complexity of these systems continues to increase. In some circumstances data can be stored in one location, and pointers or stubs can be stored on network devices to facilitate access to and modification of these data by many different enterprise systems.

Problems can occur however, when data is stored in types of systems that have been enabled by advances in computer technology, such as in systems not directly controlled by an enterprise, e.g., cloud-based storage solutions. Some of these problems include modification or removal of data that is referenced by multiple enterprise systems.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a processor and a memory that can store executable instructions that, when executed by the processor, can execute computer executable components stored in the memory, including a request component that can communicate a removal request to network equipment to remove a resource from storage by first storage equipment. The system can further include an indicator component that can receive, from the network equipment, a first indication that the removal request did not cause removal of the resource. In this example, the removal request can be determined not to have caused the network equipment to remove the resource based on index information of a resource index, which could have identified that the resource was referenced by a resource stub stored on second storage equipment.

In additional embodiments of the system, the indicator component can further receive a second indication that the removal request did cause removal of the resource, and wherein the removal of the resource was caused by the removal request and the resource index being further identified not to comprise any resource stubs referencing the resource.

In additional embodiments, the resource index can be further identified not to comprise any resource stubs referencing the resource, and thus cause the network equipment to remove references to the resource from the resource index. In a variation of this, the removal request can include a removal request to remove a first subpart of the resource, and based on the resource index being further identified not to comprise any resource stubs referencing the first subpart of the resource, the first subpart of the resource can be removed, while leaving the second subpart of the resource.

In a variation of the system, the resource can be a data object managed by an object-based storage architecture. In further variations, the data object can be a cloud-data object and the first storage equipment can be cloud-based object storage equipment.

According to another embodiment, a method can comprise receiving, by a device comprising a processor, a removal request to remove a resource from storage by first storage equipment. The method can further include, based on a resource index, identifying that the resource can be referenced by a resource stub stored on second storage equipment, and based on the identified resource stub, the method can prevent removal of the resource from the first storage equipment.

In additional embodiments, the method can further include receiving, by the device, an indication that the resource stub was removed from the second storage equipment, and based on the indication, the resource index can be updated with the identified information. Further, based on the updated resource index, one or more embodiments can facilitate removal of the resource from the first storage equipment in accordance with the removal request.

Additionally, the method can further include, determining that the updated resource index does not comprise any other resource stub references to the resource, and the removal of the resource from the first storage equipment can be further based on this determination. Further based on the determination not to comprise any other resource stub referencing the resource, facilitating, by the device, removing a reference to the resource in the resource index.

In a variation of the above method embodiments, the removal request to remove the resource can be a removal request to remove a first subpart of the resource, not the entire resource. In this example, based on the resource index, that the first subpart of the resource can be identified as not being referenced by any resource stub, based on this determination, removal of the first subpart of the resource from the resource from the first storage equipment can be facilitated by one or more embodiments.

In other variations, the resource of the system can be a data object managed by an object-based storage architecture. Further, the data object can be a cloud-data object store in a cloud-based object storage equipment. Further, the resource index can be stored in a relational database structure.

Other embodiments can be implemented as machine-readable storage medium that include executable instructions that, when executed by a processor of a device, facilitate performance of operations that include receiving a removal request to remove a resource from storage by first storage equipment. The operations can further include, based on a resource index, identifying that the resource can be referenced by a resource stub stored on second storage equipment, and based on the resource stub, the operations can prevent removal of the resource from the first storage equipment.

In additional embodiments of the machine-readable storage medium the operations can further include receiving an indication that the resource stub was removed from the second storage equipment, and based on the indication, an operation can update the resource index. Based on the updated resource index, one or more embodiments can facilitate removal of the resource from the first storage equipment, in accordance with the removal request.

In yet another embodiment, the machine-readable storage medium can store operations that further include determining that the updated resource index does not comprise any other stub references to the resource, with the facilitating the removal of the resource from the first storage equipment being further based on the resource index not referencing any other resource stubs referencing the resource.

Further, the machine-readable storage medium can include operations that, based on the resource index not comprising any other resource stub referencing to the resource, facilitate removing reference to the resource in the resource index.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating maintaining distributed references to data stored on devices of a computer network, in accordance with one or more embodiments. As will be understood, the implementation(s) described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein can employ hardware and/or software to solve problems that are highly technical in nature (e.g., rapid determination and dissemination of distributed dependencies between references to data objects and the stored data objects), that are not abstract and cannot be performed as a set of mental acts by a human. For example, a human, or even a plurality of humans, cannot efficiently, accurately and effectively, collect, encode, and transfer configuration information for shared, distributed data of a computer system, with the same level of accuracy and/or efficiency as the various embodiments described herein.

As will be understood, the implementation(s) described herein are non-limiting examples, and variations to the technology can be implemented. As such, any of the embodiments, aspects, concepts, structures, functionalities, implementations and/or examples described herein are non-limiting, and the technology may be used in various ways that provide benefits and advantages in distributed systems technology in general, both for existing technologies and technologies in this area that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
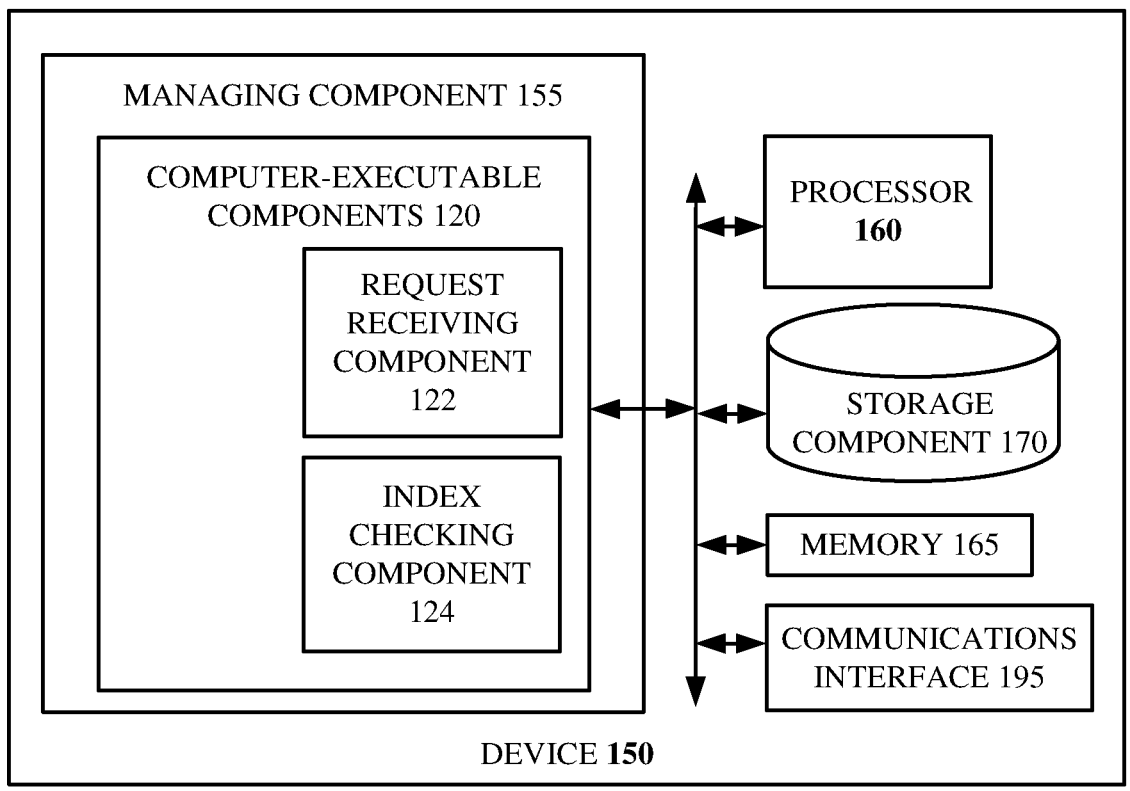
FIG. 1 illustrates a block diagram of an example, non-limiting system that can facilitate maintaining distributed references to data stored on devices of a computer network, in accordance with various aspects and implementations of the subject disclosure.

FIG. 1 illustrates a block diagram of an example, non-limiting system 100 that can facilitate maintaining distributed references to data stored on devices of a computer network, in accordance with various aspects and implementations of the subject disclosure. Repetitive description of like elements and/or processes employed in respective embodiments is omitted for sake of brevity.

System 100 can include device 150 that can incorporate managing component 155, memory 165, and communications interface 195. Managing component 155 can include computer-executable components 120. Examples of network 190 that can be used by one or more embodiments are discussed with FIGS. 9 and 10 below.

In one or more embodiments, memory 165 can store computer executable components, and processor 160 can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

Computer-executable components 120 can include components described or suggested by one or more embodiments of system 100 and other systems discussed herein. For example, system 100 can facilitate maintaining distributed references to data stored on devices of a computer network, with computer-executable components 120 that include, but are not limited to, request receiving component 122, and index checking component 124.

Example systems with distributed applications which can employ one or more of the approaches described with embodiments herein include, but are not limited to POWERSCALE CLOUD STORAGE®, an example network attached storage (NAS) platform provided by DELL EMC, Inc.

Figure 2:
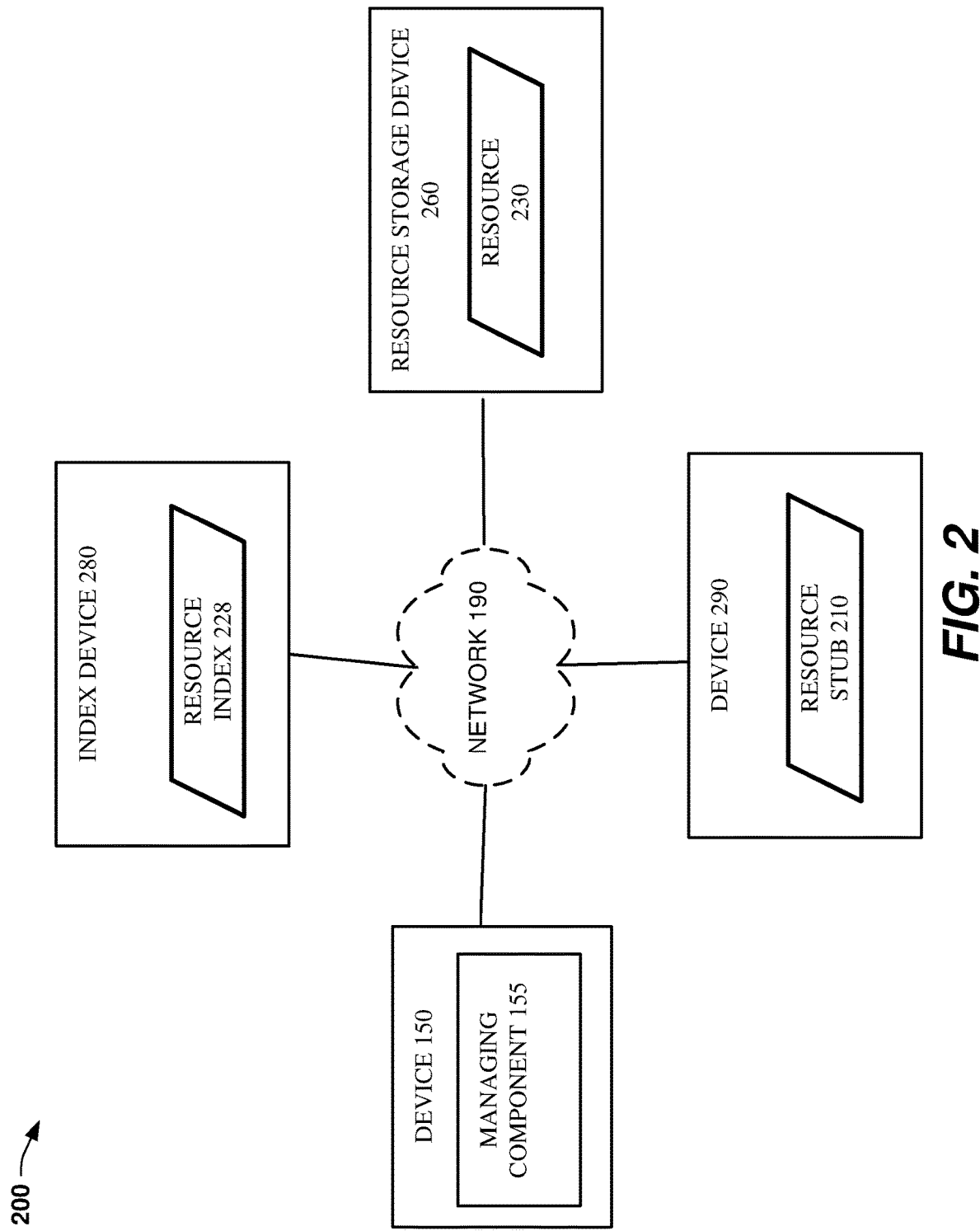
FIG. 2 illustrates a block diagram of a system that can facilitate maintaining distributed references to data stored on devices of a computer network, in accordance with one or more embodiments.

FIG. 2 illustrates a block diagram of a system 200 that can facilitate maintaining distributed references to data stored on devices of a computer network, in accordance with one or more embodiments. Repetitive description of like elements and/or processes employed in respective embodiments is omitted for sake of brevity.

System 200 can include managing component 155 of device 150 communicatively coupled via network 190 to device 290, index device 280, and resource storage device 260. It should be noted that, while many examples discussed herein depict management functions as performed by device 150 (e.g., by request receiving component 122, and index checking component 124), these functions can be performed by any of the computer systems described herein, e.g., either as part of a centralized management (e.g., with a separate managing device with functions of managing component 155, peer to peer management (as depicted, with device 150 and device 290 being peer network device), or a combination of both. For many of the examples discussed below, both a centralized approach and a peer to peer approach are discussed. It should be noted that the examples discussed herein and depicted in the figures that have a single managing component 155, index device 280, and resource storage device 260 are non-limiting, and multiple instances of implementations of function associated with these elements can work similarly to the single instances discussed herein. In one example of this, each of devices 150 and 290 can perform managing component 155 functions for different network devices, or for the devices themselves.

In one or more embodiments, index device 280 can include resource index 228, resource storage device 260 can include resource 230, and device 290 can include resource stub 210. In one or more embodiments, resource stub 210 can be a reference to the underlying resource 230 on resource storage device 260. In some implementations, resource stub 210 can provide mechanisms to facilitate allowing resource 230 to be modified or deleted on a particular system (e.g., device 290) while enabling access to resource 230 by other devices in the system, e.g., discussed with FIGS. 3, 5, and 6 below.

In one or more embodiments, request receiving component 122 can receive a removal request to remove resource 230 from storage by resource storage device 260, and based on resource index 228, the resource to be removed can be determined, by index checking component 124 to be referenced by resource stub 210 stored on resource storage device 260. Additionally, based on resource stub 210, managing component 155 can remove of the resource from the first storage equipment.

It should further be noted that, in one or more embodiments, a restore workflow can be utilized that restores access to resource 230 after the deletion process described above, e.g., by restoring resource 230 to being available via network 190, and by restoring entries in resource index 228 to specify where resource stub 210 is repositioned.

As discussed further with FIG. 6 below. in one or more embodiments, resource 230 can also be implemented as a data object managed by an object-based storage architecture.

Figure 3:
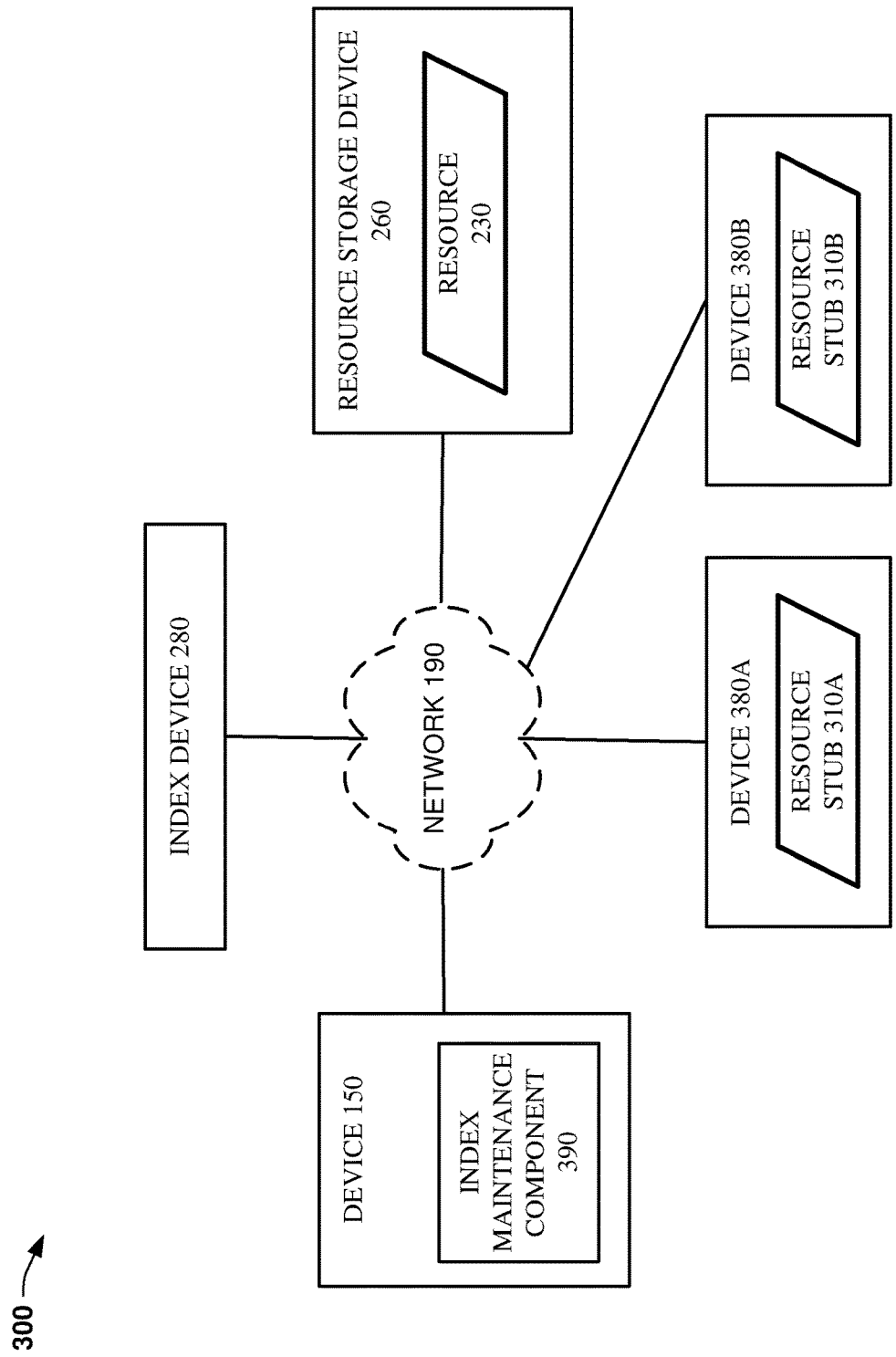
FIG. 3 depicts a non-limiting diagram of a system that can facilitate maintaining distributed references to data stored on devices of a computer network, in accordance with one or more embodiments.

FIG. 3 depicts a non-limiting diagram of a system 300 that can facilitate maintaining distributed references to data stored on devices of a computer network, in accordance with one or more embodiments. For purposes of brevity, description of like elements and/or processes employed in other embodiments is omitted. System 300 can include managing component 155 of device 150 communicatively coupled via network 190 to devices 380A-B, index device 280, and resource storage device 260. Device 150 from FIG. 1 is included with additional computer-executable components, e.g., index maintenance component 390.

In one or more embodiments, devices 380A-B can include resource stubs 310A-B respectively and, these stubs can be distinct entities even though they both reference resource 230. For example, in one approach, resource stub 310B can be an instance of resource stub 310A created by replicating resource stub 310A, and linking an identifier referencing resource 230 to the replicated resource stub 310B at its location at device 320B.

In one or more embodiments, resource index 228 can be updated by multiple devices in a strongly consistent fashion, e.g., with atomic updates being used to update single entries and transactional updates being used for updating multiple index entries. One reason to maintain strongly consistent updates is to facilitate index maintenance processes, e.g., by index maintenance component 390 discussed below.

In one or more embodiments, index maintenance component 390 can remove reference in the index to resource stub 310B being at device 380B and then check to see if any other entries in the index reference stubs for resource 230. When references remain in the index to resource 230 (e.g., resource stub 310A stored a device 380A), then no further action is taken by one or more embodiments.

Alternatively, when index maintenance component 390 determines that no resource stub references to resource 230 remain in resource index 228, index maintenance component 390 can facilitate the removal of any placeholder index references to resource 230 as well as resource 230 itself. In one or more embodiments, maintaining strongly consistent updates to resource index 228 can reduce the likelihood of permitting the removal of resource 230 when resource stubs remain that reference resource 230.

In one or more embodiments, an indication can be received that resource stub 310A was removed from the resource device 380A, and based on this indication, index maintenance component 390 can update resource index 228 to incorporate the change. In one or more embodiments, as an additional function, index maintenance component 390 can determine that the updated resource index does not comprise any other resource stub references to the resource, e.g., the last reference to resource 230 was removed from the index. Based on this determination (e.g., that the last reference to resource 230 was removed from resource index 228), managing component 155 can communicate a request to resource storage device 260 to remove resource 230 from storage on resource storage device 260.

In another embodiment, a removal condition can be associated with the resource 230 (and noted in the index). In that case even though both resource stubs 310A-B are deleted, the resource 230 will not be deleted until the removal condition is satisfied, e.g., a certain number of days after the request to remove resource 230 issued. In another example, the removal condition is such that the removal time is extended indefinitely. e.g., at a future time, resource 230 can be restored based on a new resource stub on a different device, even though the original devices (e.g., devices 380A-B) are done using it.

In one or more embodiments, workflows that store resources 230 and resource stubs 310A-B at various locations can also generate and store mapping entries in resource index 228.

Figure 4:
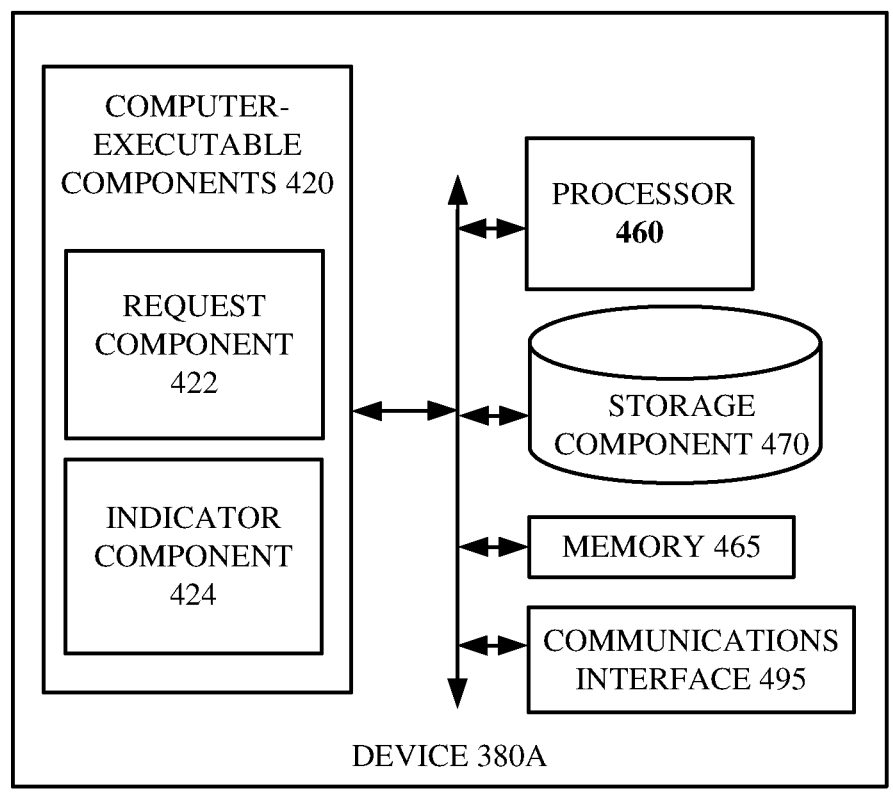
FIG. 4 depicts non-limiting system that can facilitate maintaining distributed references to data stored on devices of a computer network, in accordance with one or more embodiments.

FIG. 4 depicts non-limiting system 400 that can facilitate maintaining distributed references to data stored on devices of a computer network, in accordance with one or more embodiments. For purposes of brevity, description of like elements and/or processes employed in other embodiments is omitted. System 400 can include a more detailed view of device 380A that incorporates computer-executable components 420, processor 460, storage component 470, memory 465, and communications interface 495.

In processes similar to those discussed with device 150 of FIG. 1, in one or more embodiments, memory 465 can store computer executable components 420 and processor 460 can execute the computer executable components 420 stored in the memory, e.g., request component 422, indicator component, and any other components suggested by one or more embodiments described herein.

Considering the elements of FIG. 4 operating within system 300 of FIG. 3 above, in an example implementation of computer executable components 420, request component 422 can communicate a removal request to managing component 155 to remove resource 230 from storage by resource storage device 260.

In one or more embodiments, resource index 228 can be updated by multiple devices in a strongly consistent fashion, e.g., with atomic updates being used to update single entries and transactional updates being used for updating multiple index entries. One reason to maintain strongly consistent updates is to facilitate index maintenance processes, e.g., by index maintenance component 390 discussed below.

In one or more embodiments, index maintenance component 390 can remove reference in the index to stub 310B being at device 380B and then check to see if any other entries in the index reference stubs for resource 230. Based on this and additional operations by managing component 155, indicator component 424 of device 380A can receive from managing component 155, an indication that the removal request did not cause removal of resource 230, e.g., the removal request did not cause managing component 155 to facilitate removal of the resource 230, as requested.

In some implementations, not removing resource 230 based on the request from device 380A can be based on index information of resource index 228 that identified to managing component 155 that resource 230 was still referenced by resource stub 310B, stored on device 380B.

Figure 5:
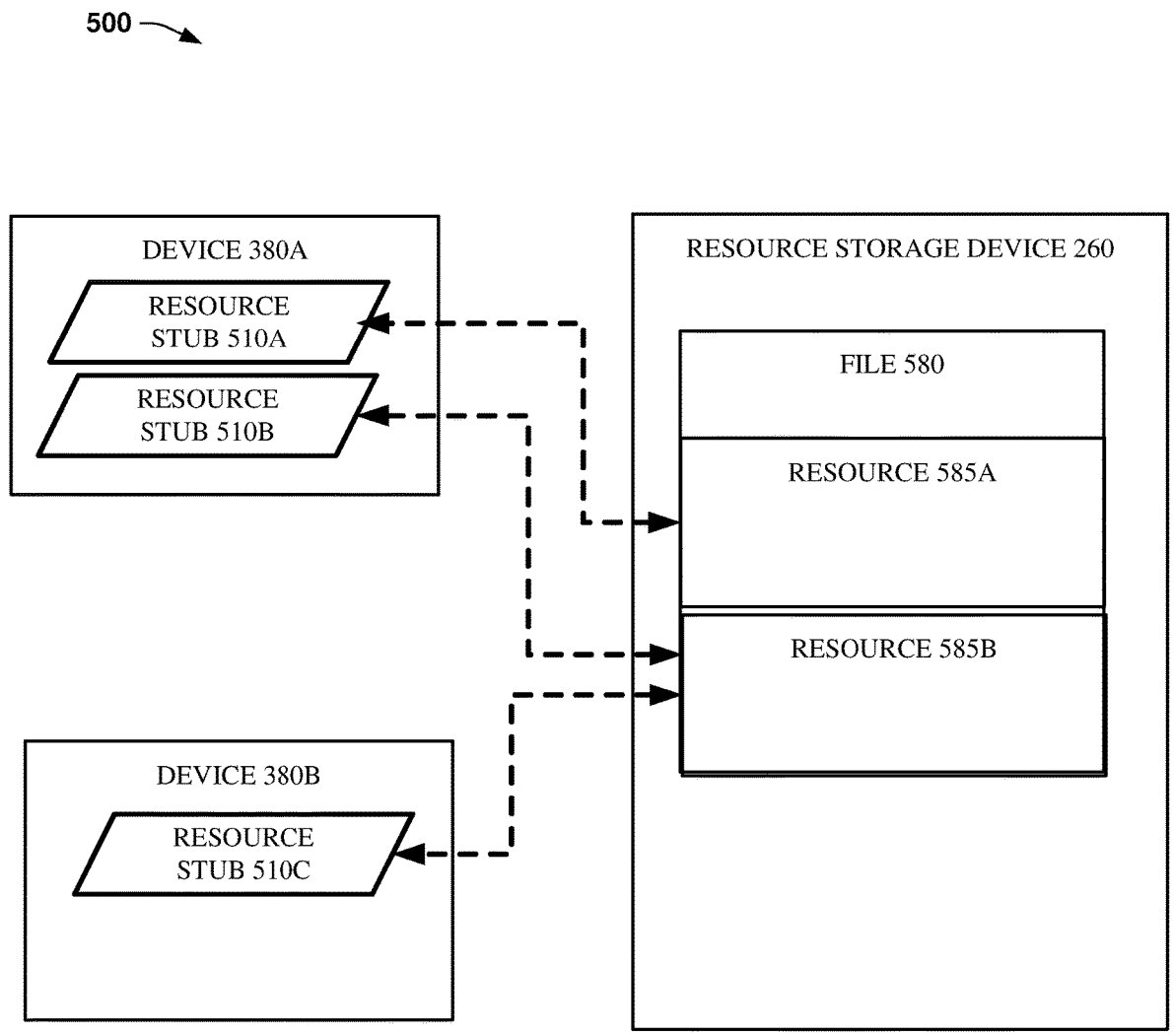
FIG. 5 depicts a non-limiting example system 500 that depicts linkages between resource stubs and subparts of a resource in accordance with one or more embodiments.

FIG. 5 depicts a non-limiting example system 500 that depicts linkages between resource stubs and subparts of a resource in accordance with one or more embodiments. For purposes of brevity, description of like elements and/or processes employed in other embodiments is omitted.

System 500 can include devices 380A-B with stubs 510A-C variously linked to one or more resources 585A-B. As would be appreciated by one having skill in the relevant art(s), given the disclosure herein, in some implementations, resource stubs 510A-C can not only refer to an entire resource (e.g., resource 230 can refer to an entire file), but also to subparts of resources, e.g., resources 585A-B refer to respective subparts of file 580. Based on this removal request, and following the operations of the disclosure above, in one or more embodiments, resource index 228 can reference resources 585A-B as parts of file 580.

In a variation of operations discussed above, a removal request from device 380A can reference removal of only resource 585A of file 580. In accordance with the operations described for removal requests directed to full resources, when a request is made to remove a resource with no other references in resource index 228, managing component 155 can facilitate the removal of the referenced resource. For example, as depicted in FIG. 5, a request can be made by device 380A to remove resources 585A-B based on the removal of resource stubs 510A-B, e.g., the entire file 280. With respect to device 380B however, resource stub 510C references resource 585B, and thus the entire file 580 is not removed, only, in some embodiments, the first part referenced by resource 585A.

In this example, index maintenance component 390 can identify that resource 585A is not referenced by any resource stub of the system, and based on this identification, managing component 155 can facilitate removal of resource 585A from resource storage device 260, e.g., part of file 580 can be removed with another part referenced by resource stub 510C remains.

Figure 6:
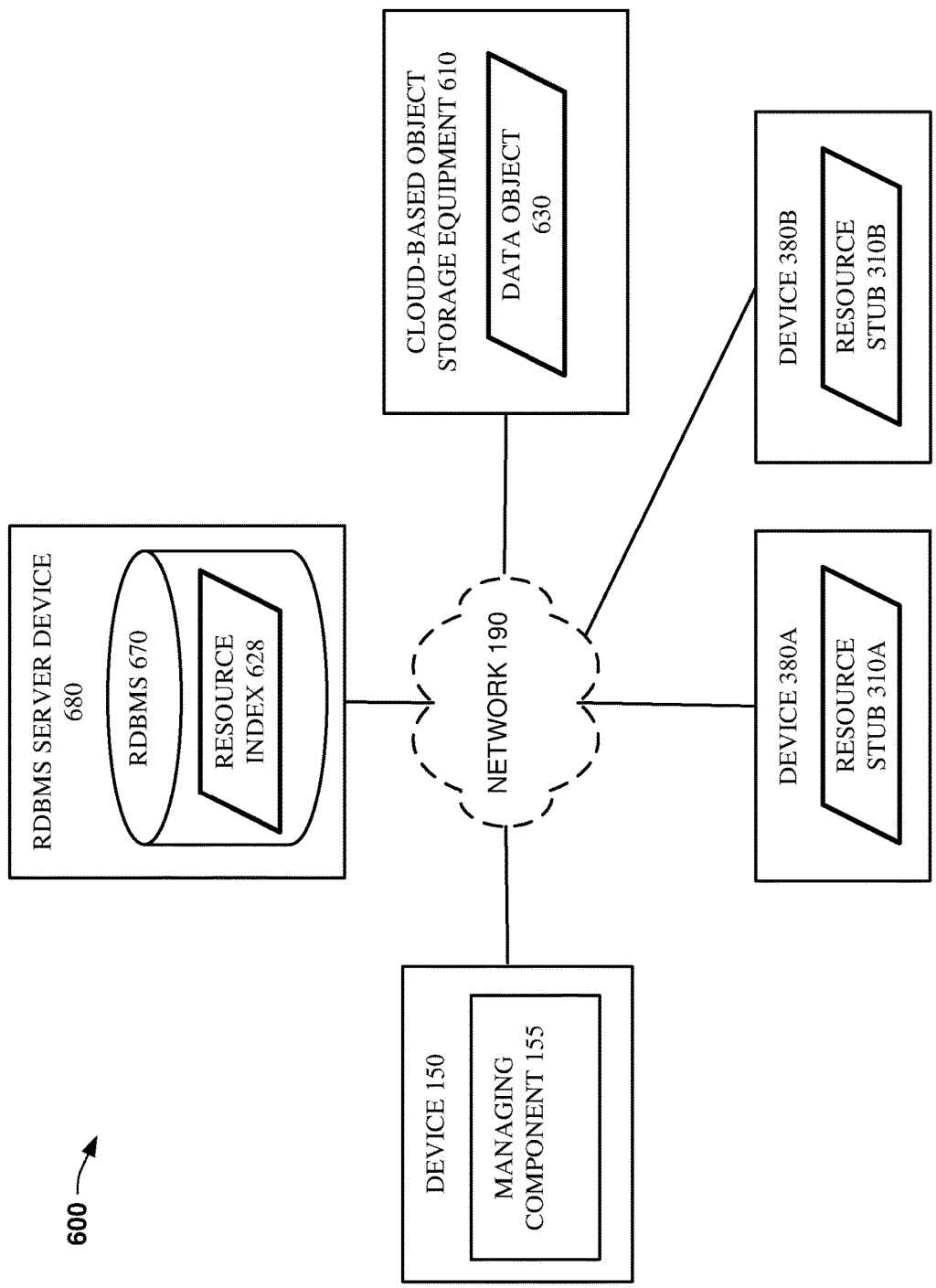
FIG. 6 depicts a non-limiting example system 600 that can facilitate maintaining distributed references to cloud-data objects stored on cloud-based object storage equipment, in accordance with one or more embodiments.

FIG. 6 depicts a non-limiting example system 600 that can facilitate maintaining distributed references to cloud-data objects stored on cloud-based object storage equipment, in accordance with one or more embodiments. For purposes of brevity, description of like elements and/or processes employed in other embodiments is omitted.

System 600 can include managing component 155 communicatively coupled via network 190 to devices 380A-B, cloud-based object storage equipment 610, and relational database management system (RDBMS) server device 680, with RDBMS 670 performing some functions similar to those described above with reference to index device 280. It should be noted that, with this and other examples discussed herein, an implementation of resource index 228 with RDBMS 670 can be in some embodiments, while in other embodiments, other approaches to accessing indexed information can be used.

Data object 630, in accordance with one or more embodiments, can be implemented as a cloud-data object and resource storage device 260 can be implemented as cloud-based object storage equipment 610. In one or more embodiments, resource index 228 can be stored in a relational database structure, e.g., in RDBMS 670 hosted by RDBMS server device 680, e.g., resource index 228 adhering to a relational database format.

In one or more embodiments, RDBMS 670 can hold resource index 628, cloud-based object storage equipment 610 can host data object 630, and devices 380A-B can respectively store resource stubs 310A-B. In one or more embodiments, resource index 628 can be termed a cloud object referrer index (CORI), with entries that map resource stubs 310A-B to the clusters upon which they are located, e.g., devices 380A-B.

Figure 7:
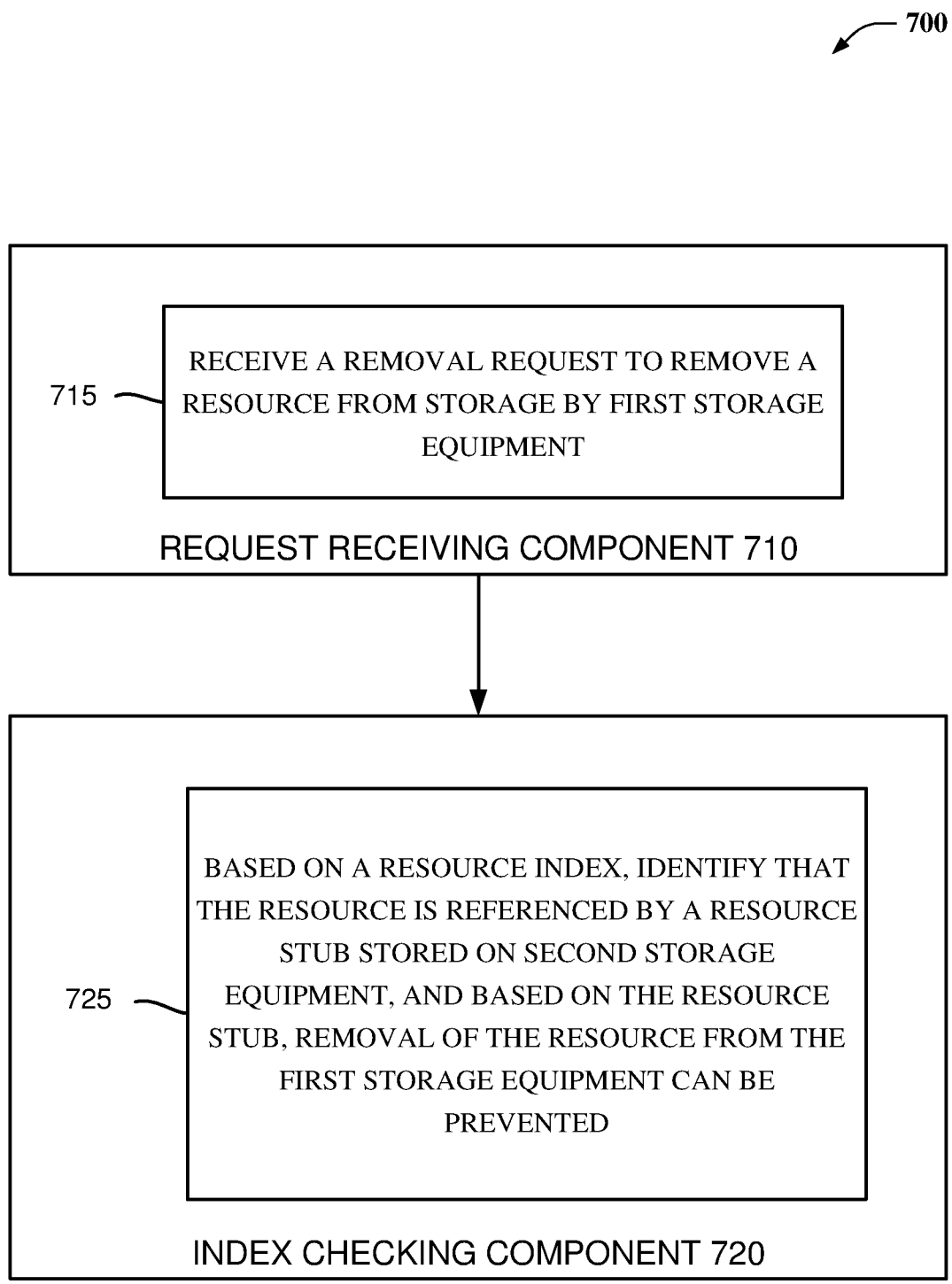
FIG. 7 is a flow diagram representing example operations of an example system that includes a request receiving component, and an index checking component that can facilitate maintaining distributed references to data stored on devices of a computer network, in accordance with one or more embodiments.

FIG. 7 is a flow diagram representing example operations of an example system 700 comprising request receiving component 710, and index checking component 720 can facilitate maintaining distributed references to data stored on devices of a computer network, in accordance with one or more embodiments. For purposes of brevity, description of like elements and/or processes employed in other embodiments is omitted.

In one or more embodiments of system 700, request receiving component 710 can at 715, receive a removal request to remove a resource from storage by first storage equipment. For example, in an example of system 700, request receiving component 122 can receive a removal request from device 380A to remove resource 230 from resource storage device 260.

In one or more embodiments of system 700, index checking component 720 can at 725, based on a resource index, identify that the resource is referenced by a resource stub stored on second storage equipment, and based on the resource stub, removal of the resource from the first storage equipment can be prevented. For example, in an example of system 700, index checking component 124 can, based on resource index 228, identify that resource 230 is referenced by resource stub 310A stored on device 380A, and based on resource stub 310A, removal of resource 230 from resource storage device 260 can be prevented.

Figure 8:
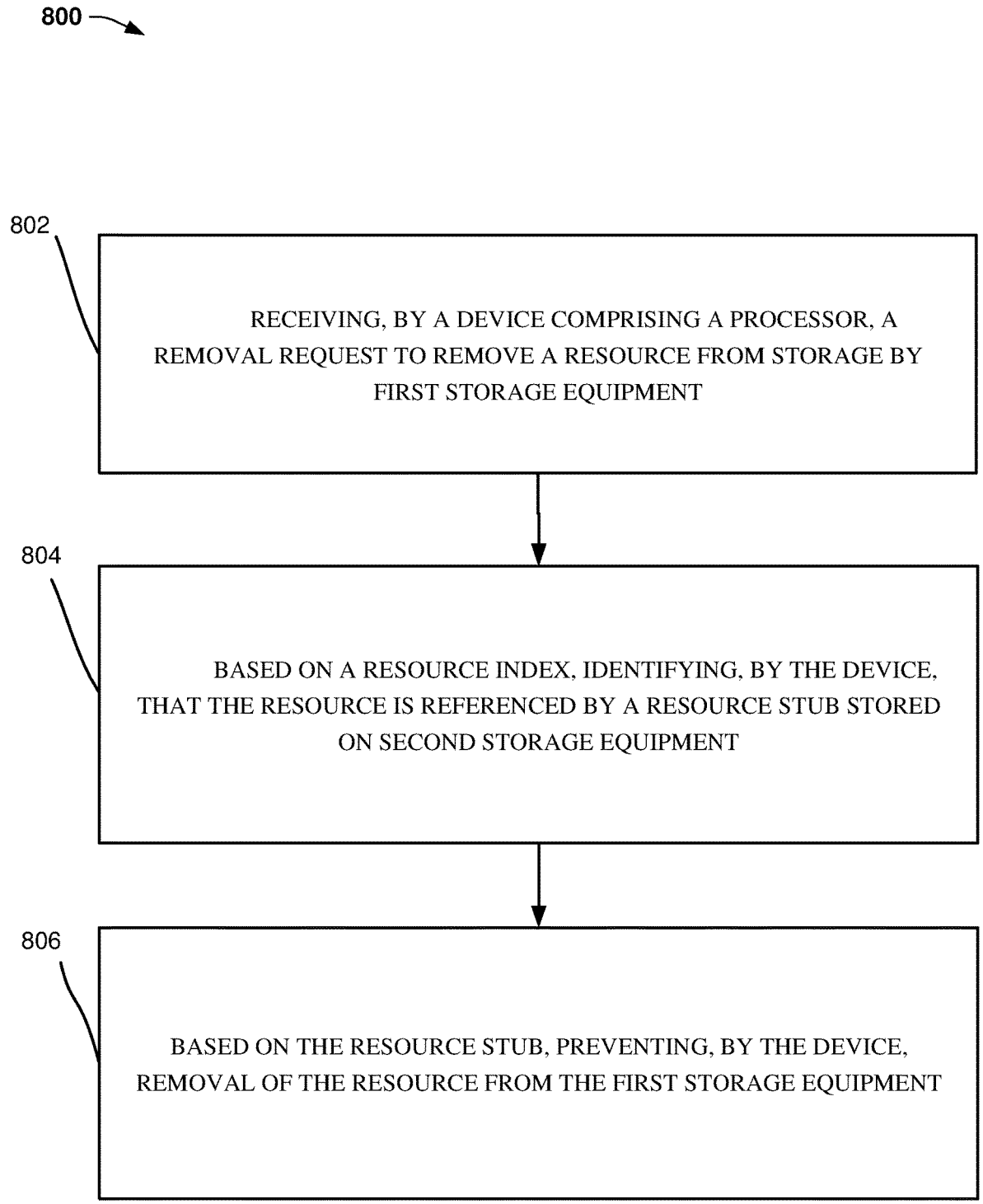
FIG. 8 illustrates an example flow diagram for a method that can facilitate maintaining distributed references to data stored on devices of a computer network, in accordance with one or more embodiments.

FIG. 8 illustrates an example flow diagram for a method 800 that can facilitate maintaining distributed references to data stored on devices of a computer network, in accordance with one or more embodiments. For purposes of brevity, description of like elements and/or processes employed in other embodiments is omitted.

At element 802, method 800 can comprise receiving, by a device comprising a processor, a removal request to remove a resource from storage by first storage equipment. An example of method 800 can comprise receiving, by managing component 155, a removal request from device 380B to remove resource 230 from resource storage device 260.

At element 804, method 800 can comprise, based on a resource index, identifying, by the device, that the resource is referenced by a resource stub stored on second storage equipment. An example of method 800 can comprise, based on resource index 228, identifying, by index checking component 124, that resource 230 is referenced by resource stub 310A stored on device 380A. At element 806, method 800 can comprise, based on the resource stub, preventing, by the device, removal of the resource from the first storage equipment. An example of method 800 can comprise, based on the resource stub, preventing, by managing component 155, removal of resource 230 from resource storage device 260.

Figure 9:
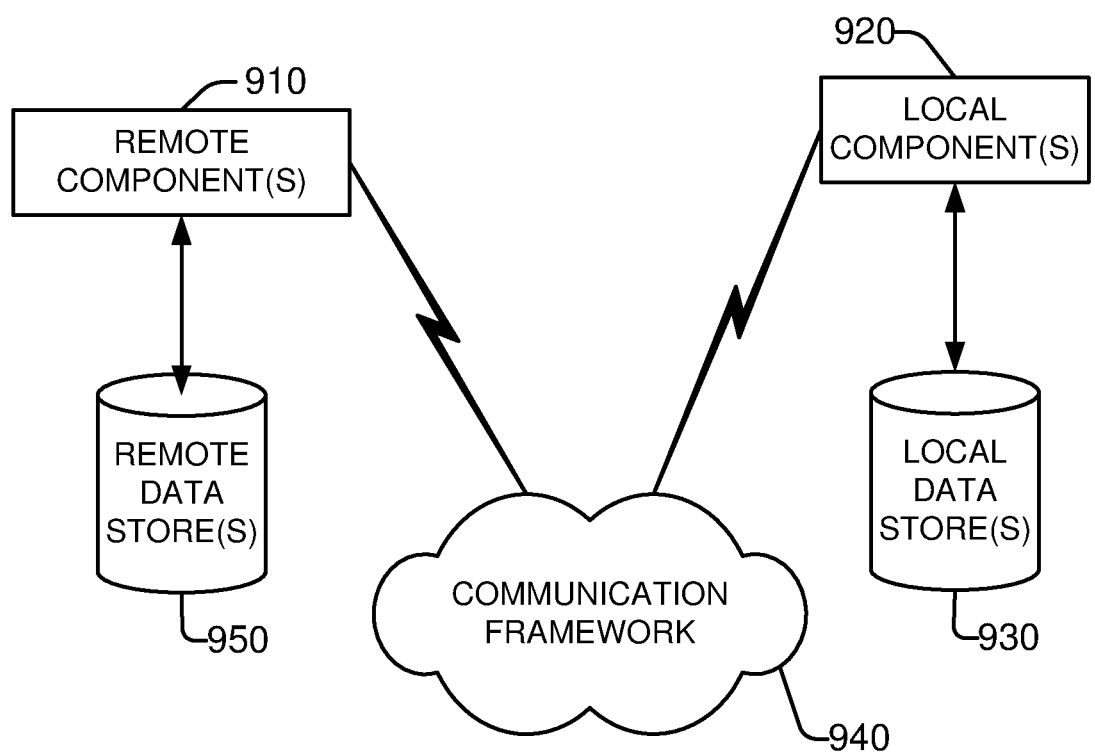
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
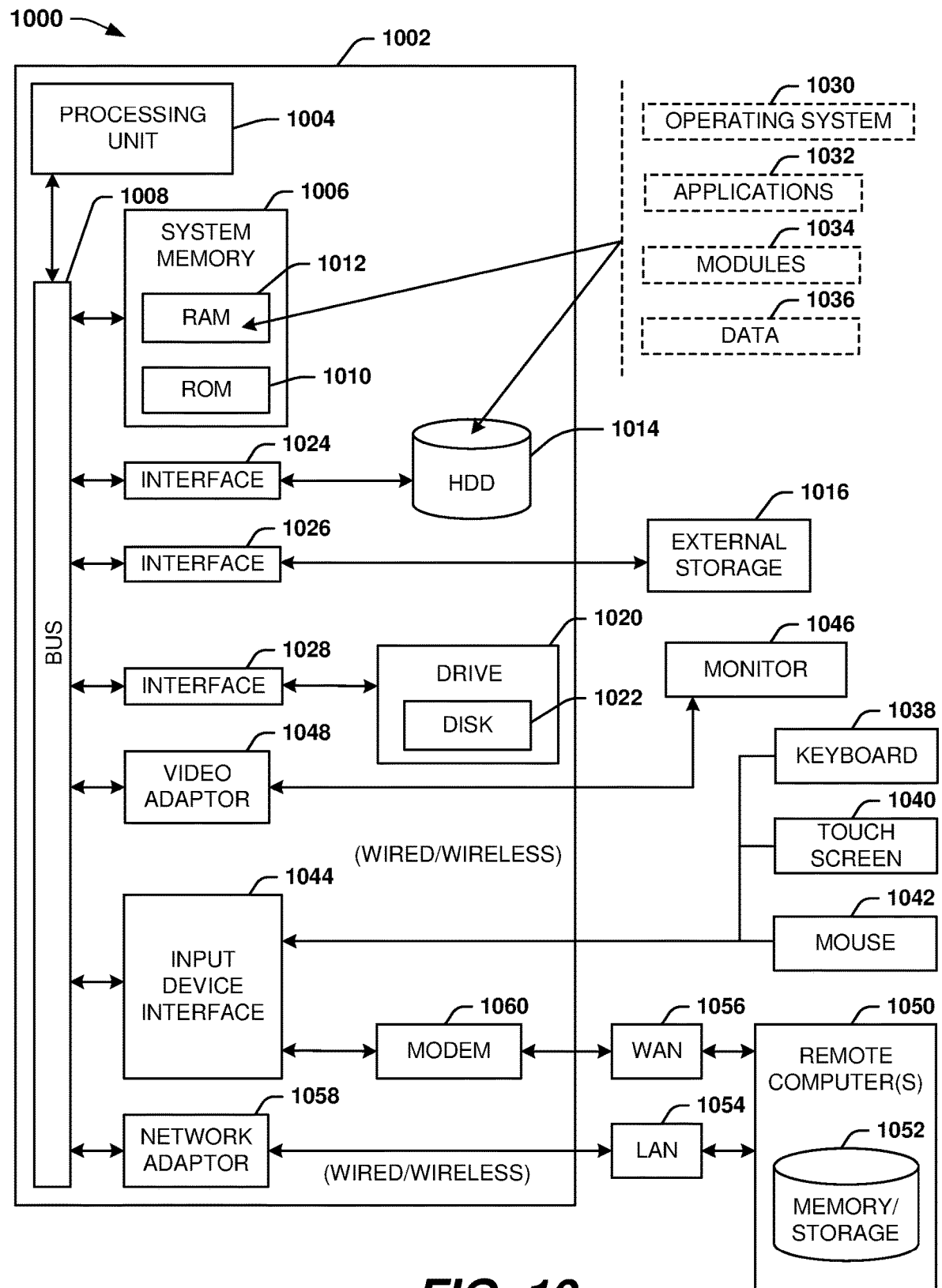
FIG. 10 illustrates an example block diagram of a computing system operable to execute the disclosed systems and methods in accordance with various aspects and implementations of the subject disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A method, comprising:
   receiving, by a device comprising a processor, a removal request to remove a resource from storage by first storage equipment;
   based on a resource index, identifying, by the device, that the resource is referenced by a resource stub stored on second storage equipment; and
   based on the resource stub, preventing, by the device, removal of the resource from the first storage equipment.

2. The method of claim 1, further comprising:
   receiving, by the device, an indication that the resource stub was removed from the second storage equipment;
   based on the indication, updating, by the device, the resource index, resulting in an updated resource index; and
   based on the updated resource index, facilitating, by the device, removal of the resource from the first storage equipment in accordance with the removal request.

3. The method of claim 2, further comprising:
   determining, by the device, that the updated resource index does not comprise any other resource stub references to the resource, wherein the facilitating of the removal of the resource from the first storage equipment is further based on the resource index being determined not to comprise any other resource stubs referencing the resource.

4. The method of claim 3, further comprising, based on the resource index being determined not to comprise any other resource stub referencing the resource, facilitating, by the device, removing a reference to the resource in the resource index.

5. The method of claim 1, wherein the resource comprises a data object managed by an object-based storage architecture.

6. The method of claim 5, wherein the data object comprises a cloud-data object and the first storage equipment comprises cloud-based object storage equipment.

7. The method of claim 1, wherein the removal request to remove the resource comprises a removal request to remove a first subpart of the resource.

8. The method of claim 7, further comprising:
identifying, by the device, that the resource is referenced by the resource stub comprising identifying that a second subpart of the resource is referenced by the resource stub;
based on the resource index, identifying, by the device, that the first subpart of the resource is not referenced by any resource stub; and
based on the first subpart of the resource being determined not to be referenced by any resource stub, facilitating, by the device, removal of the first subpart of the resource from the resource from the first storage equipment.

9. The method of claim 1, wherein the resource index is stored in a relational database structure.

10. A device, comprising:
a memory that stores computer executable components;
a processor that executes the computer executable components stored in the memory, wherein the computer executable components comprise:
a request component that communicates a removal request to network equipment to remove a resource from storage by first storage equipment, and
an indicator component that receives, from the network equipment, a first indication that the removal request did not cause removal of the resource, wherein the removal request is determined not to have caused the network equipment to remove the resource based on index information of a resource index, which identified that the resource was referenced by a resource stub stored on second storage equipment.

11. The device of claim 10, wherein the indicator component further receives a second indication that the removal request caused removal of the resource, and wherein the removal of the resource was caused by the removal request and the resource index being further identified not to comprise any resource stubs referencing the resource.

12. The device of claim 11, wherein the resource index was further identified not to comprise any resource stubs referencing the resource, thereby causing the network equipment to remove references to the resource from the resource index.

13. The device of claim 11, wherein the removal request comprises a removal request to remove a first subpart of the resource, and wherein, based on the resource index being further identified not to comprise any resource stubs referencing the first subpart of the resource, caused removal of the first subpart of the resource and a second subpart of the resource remaining.

14. The device of claim 10, wherein the resource comprises a data object managed by an object-based storage architecture.

15. The device of claim 14, wherein the data object comprises a cloud-data object and the first storage equipment comprises cloud-based object storage equipment.

16. The device of claim 10, wherein the resource index is stored in data structure adhering to a relational database format.

17. A non-transitory machine-readable medium comprising executable instructions that, when executed by a processor of a device, facilitate performance of operations, the operations comprising:
receiving a removal request to remove a resource from storage by first storage equipment;
based on a resource index, identifying that the resource is referenced by a resource stub stored on second storage equipment; and
based on the resource stub, preventing removal of the resource from the first storage equipment.

18. The non-transitory machine-readable medium of claim 17, wherein the operations further comprise:
receiving an indication that the resource stub was removed from the second storage equipment;
based on the indication, updating the resource index, resulting in an updated resource index; and
based on the updated resource index, facilitating removal of the resource from the first storage equipment, in accordance with the removal request.

19. The non-transitory machine-readable medium of claim 18, wherein the operations further comprise determining that the updated resource index does not comprise any other stub references to the resource, and wherein the facilitating of the removal of the resource from the first storage equipment is further based on the resource index not comprising any other resource stubs referencing the resource.

20. The non-transitory machine-readable medium of claim 19, wherein the operations further comprise, based on the resource index not comprising any other resource stub referencing to the resource, facilitating removing reference to the resource in the resource index.

* * * * *